(No Model.)

G. W. SIDDONS.
HARROW.

No. 312,523. Patented Feb. 17, 1885.

Attest:
W. H. Knight
H. Bernhard

Inventor:
George W. Siddons
per Edson Bro's
Attorneys

N. PETERS, Photo-Lithographer, Washington, D. C.

UNITED STATES PATENT OFFICE.

GEORGE W. SIDDONS, OF CHARITON, IOWA.

HARROW.

SPECIFICATION forming part of Letters Patent No. 312,523, dated February 17, 1885.

Application filed April 2, 1884. (No model.)

*To all whom it may concern:*

Be it known that I, GEORGE W. SIDDONS, a citizen of the United States, residing at Chariton, in the county of Lucas and State of Iowa, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in harrows, and is specially designed for use in connection with that class known as "flexible harrows," having for its object the provision of means whereby either the forward or rear end thereof can be raised and held at different heights from the ground, thereby enabling the driver or operator to pass stony ground with ease and facility.

To these ends my invention consists in the combination, arrangement, and construction of parts for service, all as hereinafter more fully set forth, and particularly pointed out in the claim.

Figure 1:
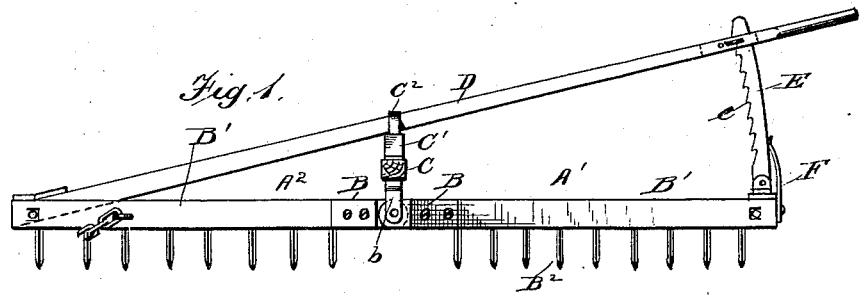
Figure 2:
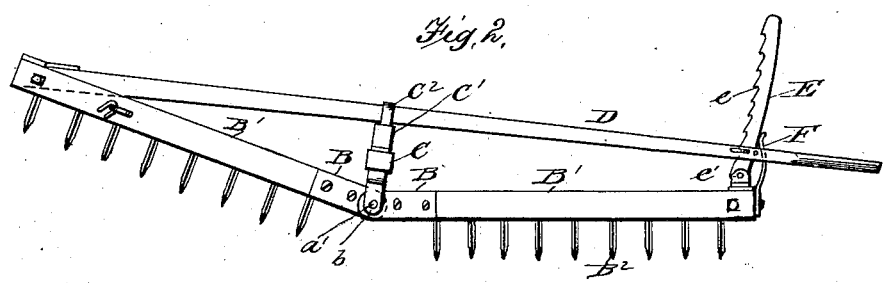
Figure 3:
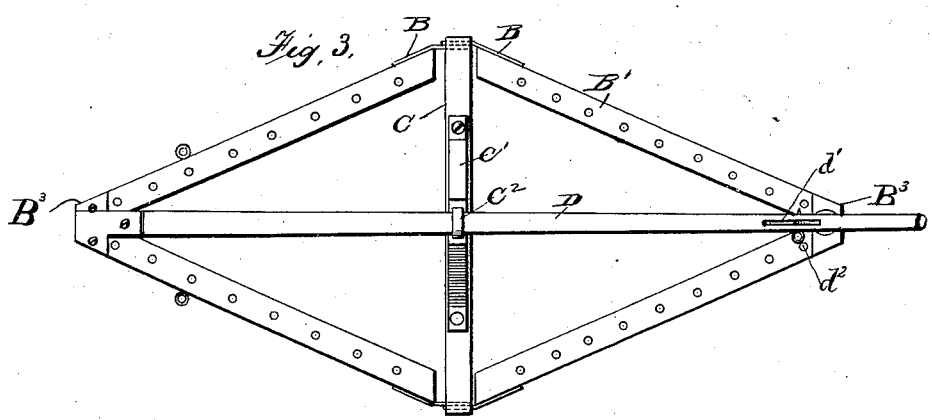
Figure 4:
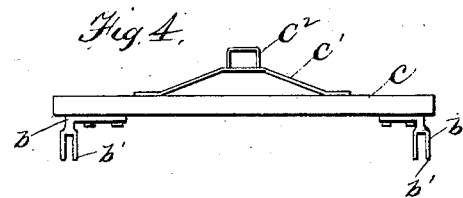

In the drawings, which form a part of this specification, Figure 1 is a side elevation of a harrow provided with my improvement, the harrow-sections being in a horizontal plane. Fig. 2 represents a side elevation showing one of the harrow-sections in an inclined position. Fig. 3 is a top plan view, and Fig. 4 is a detached detail view of the transverse middle bar and its attached parts.

Referring to the drawings, in which like letters of reference in the several figures denote like parts, A designates a harrow of that class known as the "diamond harrow," composed of sections $A'$ $A^2$, connected together by plates B, secured to the side bars of each section at their adjacent ends, said plates having apertures through which pass pivotal bolts $a'$. Each section is composed of two side bars or beams, $B'$ $B'$, having teeth $B^2$. The side bars, $B'$, are secured together at the front and rear of the harrow by plates $B^3$ and bolts, as shown. From the points named the side bars diverge outwardly to the points at which the sections are connected together, as above described.

C designates a bar extending from side to side of the harrow, and provided at its outer extremities, on the lower surface thereof, with brackets $b$, having bifurcated arms $b'$ $b'$, pivotally connected to the plates B by the same bolts that connect the plates together, as clearly shown in Fig. 1. The bar C is provided on its upper surface with a support, $C'$, having a loop, $C^2$, through which passes a lever, D, rigidly secured at its forward end between the forward ends of the side rails, $B'$, of the forward section of the harrow.

E designates a rack-bar, preferably curved, pivoted at its end to lugs $e'$, secured to the end plates, $B^3$. The bar E is provided upon its forward edge with teeth $e$. Said bar extends upward and passes through a slot, $d'$, in the lever D.

$d^2$ represents a removable pin or bolt that extends through apertures formed in the lever D at each side of the slot $d'$, and is engaged within the slot by the teeth $e$ of the rack-bar E.

F designates a spring, secured at its lower end to the rear end of the harrow, and at its upper end bears against the rear edge of the rack-bar. It will be seen that the spring F will hold the rack-bar normally against the pin and in position to engage with it when the forward section of the harrow is raised.

By a comparison of Figs. 1 and 2 it will be seen that the position of the rack-bar E is not the same when the forward section of the harrow is raised as it is when the sections are in the same plane. To compensate for such change of position due to the decreased distance between the ends of the harrows when either section is raised, I not only pivot the rack-bar F at the lower end, but also elongate the slot $d'$ in the bar and provide a second aperture for the passage of the pin $d^2$, said pin being moved from one to the other of said apertures as the sections are raised or lowered. The upper end of the rack is drawn backward by hand when it is desired to disengage it from the pin or bolt $d^2$.

Modifications in details of construction may be made without departing from the principle or sacrificing the advantages of my invention— as, for instance, in lieu of perforating the lever, the rack-bar can be passed up through a bracket secured to the side of the lever by a pin passing through the lever or bracket or rack-bar. I would therefore have it understood that I am at liberty to make such changes and alterations in the embodiment of my invention as fairly fall within its limit or scope.

It is obvious that the harrow-frame can be of any preferred construction.

I am aware that a flexible harrow having two wings hinged to each other, a sliding lever pivoted to the forward end of the front wing, and supported near its middle by a pivoted, elevated, and adjustable beam, is not broadly new.

Having thus fully described my invention, what I claim, and desire to secure by Letters Patent of the United States, is—

In a harrow, two sections, A' A², hinged together by plates B, and provided with teeth B², and cross-bar C, having brackets $b$ and support C', in combination with an inclined lever, D, secured to one of the sections, and provided with mortise $d'$ and pin $d^2$, curved rack-bar E $e$, pivoted at its lower end to the remaining section, and a spring, F, normally in contact with the rack-bar, whereby either of the harrow-sections may be raised and held at different heights from the ground and at different angles to each other, substantially as and for the purpose set forth.

In testimony whereof I affix my signature in presence of two witnesses.

GEORGE W. SIDDONS.

Witnesses:
S. S. WALKER,
JAMES BOYLAN.